United States Patent [19]

Vaughan et al.

[11] Patent Number: 4,960,578

[45] Date of Patent: Oct. 2, 1990

[54] ZEOLITE ECR-10

[75] Inventors: David E. W. Vaughan, Flemington; Karl G. Strohmaier, Port Murray, both of N.J.

[73] Assignee: Exxon Research and Engineering Company, Florham Park, N.J.

[21] Appl. No.: 264,221

[22] Filed: Oct. 28, 1988

Related U.S. Application Data

[63] Continuation-in-part of Ser. No. 122,782, Nov. 19, 1987, abandoned.

[51] Int. Cl.$^5$ .............................................. C01B 33/24
[52] U.S. Cl. .................................... 423/326; 423/328; 208/46
[58] Field of Search ............... 423/328, 329, 331, 332, 423/326; 502/60, 64; 208/46

[56] References Cited

U.S. PATENT DOCUMENTS 3,904,738  9/1975  Robson ............................... 423/329

OTHER PUBLICATIONS

Barrel et al., "Hydrothermal Chemistry of Silicates", J. Chemical Soc., 1959, pp. 195–208.
Selbin et al., "Preparation of Gallium-Containing Molecular Sieves", J. Inorg. Chem. 1961, vol. 20, pp. 225–228.
Barrer, R. M., "Hydrothermal Chemistry of Zeolites", Academic Press, 1982, pp. 137–145, 252–263.

Primary Examiner—John Doll
Assistant Examiner—R. Bruce Breneman
Attorney, Agent, or Firm—Ronald D. Hantman

[57] ABSTRACT

The present invention relates to a gallo-aluminosilicate zeolite designated as ECR-10 which contains cesium. It also relates to a process for preparation of the zeolite. It may be employed in absorbent or separation applications, particularly in separation of small molecules.

12 Claims, No Drawings

ZEOLITE ECR-10

CROSS REFERENCE TO RELATED APPLICATION

This application is a continuation-in-part of U.S. Ser. No. 122,782, filed Nov. 19, 1987, now abandoned

FIELD OF THE INVENTION

The present invention relates to a gallosilicate or gallo-aluminosilicate zeolite designated as ECR-10, which contains cesium. It also relates to a process for preparation of the zeolite and it's use as a catalyst. It may be employed in absorbent or separation applications, particularly in separation of small molecules. Recent structural analysis indicates that even though this material has a smaller unit cell than zeolite RHO, ECR-10 seems to be a Ga-containing RHO material.

BACKGROUND OF THE INVENTION

Zeolites, both natural and synthetic, have been used in a variety of catalytic and adsorptive operations. Most zeolitic materials are porous ordered aluminosilicates having a definite (although often undetermined) crystal structure. The structure may have a number of small cavities interconnected by a number of still smaller channels. Those cavities and channels are uniform in size within a certain zeolitic material. The above mentioned catalytic and adsorptive processes make use of these cavities and channels since by proper choice of zeolite, the zeolite channels will reject some molecules because of their size and accept others.

These zeolites typically are describable as a rigid three-dimensional framework of silica and alumina wherein the silica and alumina tetrahedra are linked through common oxygens. Some zeolites, however, have atoms such as gallium or germanium in a portion of the framework positions. The charge balance of the zeolite may be satisfied by inclusion of a proton, metal, or ammonium cation. The catalytic and adsorption properties of the zeolite may be varied by changing the ions within the zeolite. Conventional ion exchange techniques may be used to change those cations.

There are a large number of both natural and synthetic zeolite structures. The wide breadth of such numbers may be appreciated by considering the work *Atlas of Zeolite Structures* by W. M. Meier and D. H. Olson, published by the International Zeolite Association.

The present invention, ECR-10, is a cesium-containing gallo-aluminosilicate or gallo-silicate having the following general chemical formula:

(Na, Cs)$_2$O:(Al,Ga)$_2$O$_3$:2 to 4 SiO$_2$:0 to

Other gallosilicates are known. For instance, U.S. Pat. No. 3,431,219 to Argauer, issued Mar. 4, 1969, discloses a synthetic sodium gallo-silicate having a composition, in terms of oxide mole ratios:

0.9±0.2Na$_2$O:0.1 to 1 Ga$_2$O$_3$:3 to 12 Al$_2$O$_3$:3 to 6 SiO$_2$:3 to 12 H$_2$O

The x-ray diffraction pattern shows the structure that of zeolite Type X, a faujasite. No suggestion is made of cesium substitution. Selbin. and Mason (J. Inorg. and Nuclear Chem., 20, p. 222 (1961)) had earlier reported the synthesis of a similar X type Gallium silicate at Si/Ga=2.8, and a Gallium sodalite at Si/Ga of unity.

An extensive review of similar materials (X and Y) compared the Si/Ga distributions with the Si/Al distributions (Vaughan et al, Amer. Chem. Soc. Symp. Ser. 218. p. 231 (1983)). A review of several Gallium substituted zeolites by Newsam and Vaughan (Proc. 7th Intl. Zeolite Conf., Elsever Press, p. 457 (1986)) showed that the substitution of Ga for Al does not necessarily increase the unit cell value, but may not change the cell parameters, and in the case of sodalite, reduce it. Barrer ("Hydrothermal Chemistry of Zeolites", Academic Press, p. 282 (1982)) has reviewed the earlier Ga substitution work up to the early 1980',s, which usually involves Ga substitution for Al in the conventional Si/Al range of the subject material (zeolite or non-zeolite). The unusual characteristic of ECR-10, in contrast to this previous work, is that Ga does not substitute into the RHO framework in the normal RHO compositional range, but in an entirely different range in which RHO does not occur in the Si/Al form. More extensive synthesis work in the gallo silicate system further extends these observations to the extreme case where gallum does not substitute at all for aluminum in some zeolites (e.g., zeolite A) (Vaughan, unpublished).

U.S. Pat. No. 4,208,305 to Kouwenhoven et al, issued June 17, 1980, teaches a complex silicate containing iron/aluminum/gallium/germanium in the framework. The zeolitic material has a pore size greater than about 7 Å; a size which is significantly larger than the disclosed Most previous work on Cs containing systems at low silica ratios show that F (U.S. Pat. No. 2,996,358) and pollucite are the dominant structural forms. Previous syntheses in the TMA—Cs—Li system, however, show that several structural types are possible (Barrer and Sieber, J. Chem. Soc. Dalton, p. 1020 (1977)), and the ERC-10/RHO composition was not found.

U.S. Pat. No. 4,309,313 to Barrett and Vaughan, issued January 5, 1982, discloses a cesium-containing zeolite, denominated CSZ-1, having the formula:

0.05 to 0.55(Cs,Th)$_2$0:0.45 to 0.95 Na$_2$Al$_2$O$_3$:3 to 7 SiO$_2$:0 to 10 H$_2$O and shown to have a modified faujasite structure (Treacy et al, *J. Chem. Comm.*, 1986, p. 1211).

U.S. Pat. No. 4,333,859 to Vaughan et al, issued June 8, 1982, discloses a high silica faujasite structure, CSZ-3, having the composition:

0.02 to 0.20 Cs$_2$O:0.80 to 0.95 Na$_2$O:Al$_2$O$_3$:5 to 7 SiO$_2$:2 to 10 H$_2$O

U.S. Pat. No. 4,397,825 to Whittam, issued Aug. 9, 1983, discloses two zeolitic materials, Nu-6(1) and Nu-6(2), each having the composition:

0.5 to 1.5 R$_2$O:Y$_2$O$_3$:at least 10 XO$_2$:0 to 2000 H$_2$O where R is a monovalent cation, x is silicon and/or germanium and Y is one or more of aluminum, iron, chromium, vanadium, molybdenum, antimony, arsenic, manganese, gallium or boron, and show characteristics typical of layer type metallo-silicates.

Recent structural work has indicated that ECR-10 is a low silica analogue of the RHO structure, synthesized in a high silica aluminous form by Robson (U.S. Pat. No. 3,904,738). (One notes, however, that this conclusion is based on the interpretation of powder x-ray diffraction data, and must therefore be viewed as tentative, though convenient at this time. Spectroscopic analyses, such as infra-red analysis, does not confirm this identity.)

This gallium low silica ECR-10 form of RHO is unusual in that whereas most low silica forms of zeolites have larger unit cells than the corresponding higher silica forms, ECR-10 has a smaller unit cell than RHO itself. Similarly, because the Ga—O bond distance is larger than the Al—O bond distance, the Ga forms of a given structure also usually have a larger unit cell than the analogous Al forms-again contrary to the observation of ECR-10. The ECR-10 is therefore quite anomalous, indicating a compacted or more constrained environment than the actual (silica-alumina) RHO structure. Work by Barrer et al (Proc. 5th Intl. Zeolite Conf., Heyden Press, p. 20 (1980)) shows that the optimum synthesis is carried out at an Si/Al=11.

The compositions of the Al RHO and Ga ECR-10 may be compared as follows:

| | |
|---|---|
| RHO: | 0–1 $Na_2O$:0–1 $Cs_2O$:$Al_2O_3$:5–12 $SiO_2$ |
| ECR-10: | 0–0.6 $Na_2O$:0.4–1 $Cs_2O$:x $Al_2O_3$:1–x $Ga_2O_3$:2–4 $SiO_2$ | where x=0 to 0.25

It is useful to note that not only does Ga not substitute significantly into RHO, but Al does not significantly substitute into ECR-10, further demonstrating the novelty of the substitutional and structural chemistry of these two materials.

Unlike RHO itself, Cs is much more difficult to remove from ECR-10. If Ga is attempted to substitute directly in the RHO preparation composition range the faujasite like zeolites CSZ-1 and CSZ-3 form, together with pollucite and F. If Al is substituted directly in the ECR-10 formulation to replace Ga, pure zeolite F results. The synthesis of ECR-10 is therefore unexpected and unpredictable in this composition range. Indeed, if the Ga-0 bond is too large to substitute at the higher level of Si, it would be even less likely to substitute at lower Si levels.

SUMMARY OF THE INVENTION

The present invention deals with a small pore cesium-containing gallo-aluminosilicate zeolite, designated for convenience herein as ECR-10, chemical composition for this zeolite, expressed in terms of mole ratios of oxides, is in the range:

$(Na,Cs)_2O:(Al,Ga)_2O_3$:2–4 $SiO_2$:$xH_2O$ wherein x represents 0 to 6 depending on composition and degree of hydration. The more preferred composition for the zeolite is in the range:

0.5$Na_2O$:0.5 $Cs_2O$:(Al,Ga)$_2O_3$:2 to 3 $SiO_2$:$xH_2O$

The Ga/Al ratio is usually greater than four.

The gallo-aluminosilicate herein may be used as a sorbent (e.g., in small molecule separation such as, argon separation from oxygen, removing $C_2$ or $H_2S$ from natural gas or refinery gas streams, or for paraffin-olefin or olefin-olefin separation), or in selective catalysis. The product may be exchanged with cations from Groups I through VIII of the Periodic Table to remove and exchange the excess ions which may be undesirable, because of their location in blocking positions in the structures.

In another embodiment of this invention the novel cesium-containing gallo-aluminosilicate may be prepared by a process comprising:

(a) preparing a reaction mixture comprising an oxide of sodium, an oxide of cesium, water, a source of silica, a source of alumina and gallia and sodium alumino-silicate nucleating seeds, said reaction mixture having a composition, in terms of mole ratios of oxides, within the following ranges:

| | |
|---|---|
| $Na_2O$:$(Ga,Al)_2O_3$ | 1 to 3 |
| $Cs_2O$:$(Ga,Al)_2O_3$ | 0.1 to 2 |
| $Ga_2O_3$:$(Ga,Al)_2O_3$ | 0.7 to 1 |
| $SiO_2$:$(Ga,Al)_2O_3$ | 2 to 4 |
| $H_2O$:$(Ga,Al)_2O_3$ | 30 to 250 | said seeds, if used, being present in an amount to yield 0.1 to 10 mole percent of the total final alumina content in the mixture;

(b) blending the reaction mixture sufficiently to form a substantially homogeneous mixture;

(c) maintaining the reaction mixture at a temperature between about 40° C. and 200° C. under autogeneous pressure for a sufficient period of time to form product crystals; and (d) recovering the crystals It will be understood that the compositions herein may contain some waters of hydration (the x value above) which may be at least partially removed when the zeolites are employed as sorbents or catalysts. Furthermore, the nucleating seeds may be replaced by a cold age step, during which nuclei of ECR-10 form, prior to hot aging the preparation.

DESCRIPTION OF THE PREFERRED EMBODIMENTS

The gallo-aluminosilicate herein generally will have the formula, in terms of mole ratios of oxides, in the range:

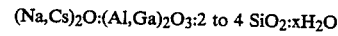

$(Na,Cs)_2O:(Al,Ga)_2O_3$:2 to 4 $SiO_2$:$xH_2O$ or preferably:

0.45 $Cs_2O$:0.55 $Na_2O$:(Ga,Al)$_2O_3$:2 to 3 $SiO_2$:$H_2O$

Minor variations in the mole ratios of the oxides within the ranges given in the chemical formulas above do not substantially alter the structure or properties of the zeolite. In addition, the number of waters of hydration x in the formula will not be the same for each preparation and will depend mainly on the degree to which the zeolite is dried.

TABLE 1

The X-Ray Diffraction Pattern For ECR-10

| D(A) | Peak Intensity | 2θ |
|---|---|---|
| 10.5 | S | 8.41 |
| 3.50 | S | 25.45 |
| 3.32 | VS | 26.86 |
| 3.16 | S | 28.19 |
| 3.03 | S | 29.47 |
| 2.71 | M | 33.04 | where the relative intensity designations are VS=100–70; S=70–40; M=40–20.

The zeolite has a cubic symmetry of a cell edge of about 14.8 Å. $^{29}$Si—MAS—NMR shows the structure to have one framework Si position. X-ray structure analysis indicates that this ECR-10 has a topology similar to zeolite RHO, but with a significantly different framework composition.

In order to convert the inventive zeolite into catalysts or absorbents it may be desirable to partially or fully replace the sodium or cesium ions wherever they may be found. The exchanged cations may be cations of metals from any one of Groups I through VIII of the Periodic Table or rare earth metals, depending on the end use desired. Preferably, the cations will be mono-, di- and trivalent metal cations, particularly from Groups I, II or III of the Periodic Table, such as barium, calcium, lithium, magnesium, potassium, strontium, zinc, or the like, or hydrogen, rare earth metals, or ammonium or alkylammonium ions The presence of these exchangeable cations will generally not cause a substantial alteration of the basic crystal structure of the zeolite Particularly preferred are mono- and divalent cations, as they are more easily included in the pores of the zeolite crystal. Any ion exchange technique may be employed such as those discussed, for example, in U.S. Pat. No. 3,216,789.

The zeolite herein may be prepared by a process in which a reaction mixture, generally a slurry, is formed of an oxide of sodium an oxide of cesium, water, a source of silica, a source of alumnia, a source of gallia, and sodium zeolitic (aluminosilicate) nucleating seeds. The oxide of sodium and cesium may be, e.g., hydroxides. The silica may be derived from sources such as, e.g., silica gels, silica acid, aqueous colloidal silica sols as described, for example, in U.S. Pat. No. 2,574,902, reactive amorphous solid silicas such as fume silicas and chemically precipitated silica sols, and cesium or sodium silicate, preferably sodium silicate. The alumina may be derived from sources such as, e.g., activated alumina, gamma alumina, alumina trihydrate, sodium aluminate, alum, kaolin, metakaolin or the like, it is noted that the sodium oxide may be provided not only directly by adding, e.g., sodium hydroxide to the mixture, but also indirectly from the source of silica and/or the source of alumina or gallium if, for example, sodium silicate and sodium aluminate (prepared by dissolving NaOH and $Al_2O_3 \cdot 3H_2O$ in water) are respectively employed as at least one of the silica and alumina sources. The preferred sources of alumina are hydrated alumina and an aluminum salt selected from the chloride, sulfate and nitrate salts.

The aluminosilicate nucleating seeds for the reaction mixture, also known as zeolitic nucleation centers, comprise of a slurry of zeolite solids having the following components: $SiO_2$, $Al_2O_3$, $Na_2O$ and $H_2O$. Generally, the seeds will have an average particle size less than 0.05 microns. The composition of the nucleating seeds in the slurry may be in the approximate ranges, in terms of mole ratios of oxides, as follows:

5 to 25 $Na_2O$:$Al_2O_3$:5 to 25 $SiO_2$:$\phi$to 500 $H_2O$

Such slurries of nucleating seeds may be prepared by the process disclosed in U.S. Pat. Nos. 3,808,326 and 4,178,352, the disclosures of which are incorporated by reference. In general, the preparation procedure involves mixing of sodium silicate, sodium aluminate and water together and aging the resulting slurry at about 0 to 50° C. for about 8 to 1440 hours, with lower temperatures requiring a longer period of time. Preferably, the slurry is aged at about 20 to 25° C. For about 16 to 336 hours and the zeolite centers have compositions in the range:

10 to 15 $Na_2O$:$Al_2O_3$:10 to 15 $SiO_2$:250 to 300 $H_2O$

The amount of nucleating seeds present in the reaction mixture is expressed in terms of the percentage of the total molar alumina plus gallia content in the aluminosilicate product which is ultimately recovered on crystallization. Thus, for example, if 5 molar percent of the nucleating seeds is added to the mixture, the seeds are contributing 5% of the total molar amount of alumina plus gallia in the zeolite product recovered. In general, the seeds are present in an amount to yield 0.1 to 20 mole percent of the total final alumina content of the product, and preferably 0.1 to 5 mole percent.

Slurries comprising recycled products of the process disclosed herein will also serve as nucleation seeds. Furthermore, self-nucleation may be induced by "cold aging" the reactant slurry composition prior to hot aging, in which case the use of external nucleant is not necessary.

The relative amounts of ingredients in the reaction mixture will be such that the mixture has a composition, in terms of mole ratios of oxides, within the following ranges:

| Oxide Constituents | Ranges of Mole Ratios |
| --- | --- |
| $Na_2O$:$(Ga,Al)_2O_3$ | 1 to 3 |
| $Cs_2O$:$(Ga,Al)_2O_3$ | 0.1 to 2 |
| $Ga_2O_3$:$(Ga,Al)_2O_3$ | 0.7 to 1 |
| $SiO_2$:$(Ga,Al)_2O_3$ | 2 to 4 |
| $H_2O$:$(Ga,Al)_2O_3$ | 30 to 250 |

Preferably, the mole ratio of $H_2O$ to $(Ga,Al)_2O_3$ in the reaction mixture ranges from 50 to 100, and the mole ratio of $SiO_2$ to $(Ga,Al)_2O_3$ from 2 to 2.5.

The order of mixing the ingredients is not essential, and all ingredients may be added simultaneously. In one preferred method of preparation, a slurry of nucleating seeds added to a blender, followed by slow addition, with mixing, of a cesium-sodium gallate-aluminate solution, sodium silicate and a sulfuric acid solution. Additional water is added to the resulting slurry. The reaction mixture is ordinarily prepared in a container made of glass, TEFLON, or metal or the like which should be closed to prevent water loss.

After the reaction mixture is formed it may be homogenized by thorough blending so as to be substantially homogeneous in texture. This step is to ensure that the product ultimately obtained is not a mixture and thus impure. The mixing may take place in any vessel e.g., a blender in which complete mixing is effected.

The homogenized mixture is then placed in a reactor, ordinarily one which can withstand elevated pressures such as a tetrafluoroethylene-lined jar or an autoclave, where it is maintained at a temperature of between about 40° C. and 200° C., preferably 75 and 125°C., and, for commercial purposes, preferably no greater than 100° C. The exact temperature will depend, for example, on the amount of sodium oxide present and the length of time employed for reaction. At temperatures above about 125° C., the zeolites obtained are no longer in substantially pure form. When the homogenized mixture is heated it is maintained at autogenous pressures which will depend on the temperature employed. Lower pressures of 1 atm may be adequate for temperatures at the lower range but at higher temperatures up to 200° C. pressures of up to about 15 atm or higher may be achieved. The amount of time required for heating will depend mainly on the temperature employed, so that at 60° C. the heating may be carried out, e.g., for up to 4 days or more, whereas at, e.g., 100° C. or more the time period may be, e.g., 4 hours. In any event, the heating is carried out until crystals are formed of the ECR-10 zeolite product.

The crystallization requires seeding the slurry before or after the blending step with minor amounts of zeolite ECR-10 crystals of this invention which are preferably chopped at low temperatures and a size range less than about 0.05 μ before that seeding. An alternate method is to breed nuclei by a lower temperature aging step at a temperature below about 40° C., in which case external seeds are not necessary.

When the crystals have been obtained in sufficient amount, they are recovered by centrifugation or filtration from the reaction mixture and are then washed, preferably with deionized water, to separate them from the mother liquor. The washing should continue, for best purity results, until the wash water, equilibrated with the product, has a pH of between about 9 and 12. After the washing step the zeolite crystals may be dried as in a kiln.

The zeolite ECR-10 of this invention may be used as an adsorbent in the separation of small molecules, e.g., $CO_2$ or $H_2S$ from natural gas or the separation of olefins from paraffins, or the drying of hydrocarbons. To be employed for these applications, the zeolite may be at least partially dehydrated by drying at temperatures of up to about 500° C. or more until most or all of the water of hydration is removed.

EXAMPLES

The examples which follow illustrate the invention. In all examples, parts and percentages are given by weight and temperatures in degrees Centigrade unless otherwise noted.

EXAMPLE 1

A reactant composition having the stoichiometry:

0.7 $Cs_2O$:1.5 $Na_2O$:$Ga_2O_3$:2 $SiO_2$:70 $H_2O$ was made by first making a sodium, cesium aluminate solution by heating 10.0 gm of NaOH, 56.5 gm. of a 50% solution of CsOH, 25.2 gm of $Ga_2O_3$ and 20 mls of water. After dissolution of the gallium oxide, the mixture as cooled slightly and then diluted with water to reduce the viscosity. In a blender was added 56.3 gm of sodium silicate solution (P.Q. Corp., N brand, 28.7% $SiO_2$, 8.9% $Na_2O$), the sodium, cesium aluminate solution and enough water to bring the total weight to 250 gm. After thorough homogenization, the mixture was transferred to a TEFLON bottle and cold aged at room temperature for four days. The mixture was then reacted at 100 C. for four days, after which the product was filtered, washed with distilled water and dried in an 115° C. oven. Phase analysis by powder x-ray diffraction showed excellent ECR-10 (Table 2) having no detectable impurities. Thermogravimetric analysis showed a 7% water loss, and chemical analysis gave a product composition of:

0.44 $Cs_2O$:0.54 $Na_2O$:$Ga_2O_3$:2.48 $SiO_2$:x $H_2O$

The unit cell of this material is cubic having dimension 14.87 Å.

TABLE 2

X-Ray Diffraction Pattern For ECR-10 Indexed On A Cubic Unit Cell

NO: 83.0802 ECR-10 S
ELEMENTS: NA CS GA AL SI O
I/I<CORUNDUM>:1.00

| NO | D | INT | HKL | NO | D | INT | HKL | NO | D | INT | HKL |
|---|---|---|---|---|---|---|---|---|---|---|---|
| 1 | 10.55042 | 62 | 110 | 13 | 2.5445 | 10 | 433 | 24 | 2.0173 | 2 | 552 |
| 2 | 6.0606 | 15 | 211 | 14 | 2.4728 | 6 | 442 | 25 | 1.9802 | 5 | 642 |
| 3 | 5.2411 | 3 | 220 | 15 | 2.4062 | 4 | 532 | 26 | 1.9486 | 7 | 730 |
| 4 | 4.6860 | 3 | 810 | 16 | 2.3430 | 13 | 620 | 27 | 1.8843 | 4 | 651 |
| 5 | 4.2808 | 19 | 222 | 17 | 2.2878 | 3 | 541 | 28 | 1.8553 | 6 | 800 |
| 6 | 3.9651 | 9 | 321 | 18 | 2.2366 | 9 | 622 | 29 | 1.8275 | 4 | 554 |
| 7 | 3.4965 | 54 | 320 | 19 | 2.1867 | 10 | 631 | 30 | 1.7992 | 13 | 644 |
| 8 | 3.3167 | 100 | 420 | 20 | 2.1445 | 2 | 444 | 31 | 1.7476 | 9 | 666 |
| 9 | 3.1626 | 61 | 332 | 21 | 2.0982 | 8 | 550 | 32 | 1.7247 | 13 | 743 |
| 10 | 3.0285 | 56 | 422 | 22 | 2.0572 | 10 | 640 | 33 | 1.6189 | 2 | 342 |
| 11 | 2.9104 | 13 | 481 | 23 | 2.0202 | 4 | 552 | 34 | 1.5997 | 4 | 761 |
| 12 | 2.7086 | 38 | 521 | | | | | | | | |

EXAMPLE 2

A reactant composition having the stoichiometry:

0.7 $Cs_2O$:1.5 $Na_2O$:(0.98 Ga, 0.02 Al)$_2O_3$:2 $SiO_2$ 70 $H_2O$ was made by mixing together:

| 10.07 gm | NaOH |
| 33.72 gm | CsOH |
| 29.51 gm | $Ga_2O_3$ |
| 58.86 gm | Na silicate ('N', PQ Corp.) |
| 1 gm | Concentrated $H_2SO_4$ |
| 146 gm | $H_2O$ | using 20.9 gm of the seed solution described in U.S. Pat. No. 3,808,326; 3,639,099 and 4,340,573, and having a composition:

13.3 $Na_2O$:$Al_2O_3$:12.5 $SiO_2$:267 $H_2O$

After six hours reaction at 100 C., the sample was filtered, washed with water and dried at 125° C. X-ray diffraction analysis gave the characteristic pattern shown in Table 2 and FIG. 1. Chemical analysis gave a composition 0.68 Al%, 4.44 Na, 12.4 Si and 23.4 Ga representing a stoichiometry 0.53 $Na_2O$:0.47 $Cs_2O$:(Al,Ga)$_2O_3$:2.44 $SiO_2$:X $H_2O$. Thermogravimetric analysis showed the sample to contain 9.3 wt.% $H_2O$ indicating that X in this formulation is about 1.4. The unit cell analysis showed a cubic unit cell having dimensions of 14.82.

Example 3

A gel of composition:

0.7 $Cs_2O$:1.5 $Na_2O$:$Ga_2O_3$:2 $SiO_2$:70 $H_2O$ was prepared by heating 25.2 grams gallium oxide in 10 grams NaOH, 56.5 grams 50% CsOH, and 20 mls $H_2O$. After the gallia dissolved, the solution was diluted back to its original volume with distilled $H_2O$ and cooled down to room temperature. This solution was added to 56.3 grams of sodium silicate solution (PQ Corp.: N brand: 8.9% $Na_2O$, 28.7% $SiO_2$) and its total weight adjusted to 250 grams by addition of $H_2O$. The resulting mixture was thoroughly homogenized in a blender and allowed to cold age for four days at room temperature in Teflon bottle. It was then reacted for four days in an 100° C. oven. The white product was reslurried in a blender, recovered by filtration, washed with distilled $H_2O$, and dried in an 115° C. oven. Phase analysis by powder x-ray diffraction showed the product to be excellent ECR-10. Elemental analysis by ICP-AES and AA gave: 4.56% Na, 25.5% Ga, 12.7% Si, 21.5% Cs. This corresponds to a product composition of:

(0.44 Cs, 0.54 Na)$_2$O: $Ga_2O_3$:2.47 $SiO_2$

EXAMPLE 4

This example demonstrates that when Ga is substituted for Al in the composition synthesis range of RHO (Robson, U.S. Pat. No. 3,904,738), Ga—RHO is not formed, but other different zeolites crystallize.

An attempt to make gallium substituted zeolite RHO-(ECR-10) was tried by direct substitution of gallium oxide for alumina in the synthesis of RHO as described by H. E. Robson, U.S. Pat. No. 3,904,738. A gel of composition:

0.4 $Cs_2O$: 2.9 $Na_2O$: $Ga_2O_3$: 10 $SiO_2$: 80 $H_2O$ was prepared by first heating 18.6 grams of $Ga_2O_3$ in 23.7 grams NaOH, 23.8 grams 50% CsOH, and 35 mls $H_2O$ until the gallium oxide dissolved. The solution was diluted with 10 mls of $H_2O$ and allowed to cool down. This solution was added to 148.9 grams of 40% aqueous colloidal silica (DuPont HS-40) and enough $H_2O$ to bring the total weight to 250 grams. It was then thoroughly homogenized in a blender and transferred to a Teflon bottle, where it was allowed to cold age for four days at room temperature. The mixture was reacted for 7 days in an 100.C. oven. The product was filtered, washed with distilled $H_2O$ and dried in an 115° C. oven. Phase analysis by powder x-ray diffraction showed the product to be crystalline Ga-CSZ-1.

EXAMPLE 5

An attempt was made to synthesize aluminum substituted ECR-10. A gel of composition:

0.7 $Cs_2O$:1.5 $Na_2O$:$Al_2O_3$:2 $SiO_2$:70 $H_2O$ was prepared by heating 21.2 grams of aluminum oxide trihydrate in 8.57 grams NaOH, 59.0 grams of 50% CsOH, and 15 mls $H_2O$. After the alumina dissolved, the solution was cooled down to room temperature and diluted back to its original volume with distilled $H_2O$. To a plastic beaker were added 51.5 grams of sodium silicate soluation (PQ Corp.; N brand: 8.9% $Na_2O$, 28.7% $SiO_2$), 18.2 grams of a seed solution (13.33 $Na_2O$: $Al_2O_3$: 12.5 $SiO_2$: 267 $H_2O$; see U.S. Pat. Nos. 3,574,538 and 4,340,573), the sodium-cesium aluminate solution, and 1.27 grams $Al_2(SO_4)_3 \cdot 17H_2O$ dissolved in 3 mls $H_2O$. The total weight of the mixture was adjusted to 250 grams by addtion of $H_2O$. It was then mixed by hand with a spatula and allowed to cold age overnight in a Teflon bottle. It was then reacted for 3.6 hours in an 100° C. oven. The white product was recovered by filtration, washed with distilled $H_2O$, and dried in an 115° C. oven. Phase analysis by powder x-ray diffraction showed the product to be crystalline Zeolite F.

EXAMPLE 6

A gel of composition:

0.5 $Cs_2O$:1.5 $Na_2O$: (0.98 Ga,0.02 Al)$_2O_3$:2.5 $SiO_2$:70 $H_2O$ was prepared by heating 27.7 grams gallium oxide in 11.9 grams NaOH, 45.3 grams of 50% CsOH, and 20 mls $H_2O$. After the gallia dissolved, the solution was diluted back to its original volume with distilled $H_2O$ and cooled down to room temperature. To a blender were added 71.1 grams of sodium silicate solution (PQ Corp.; N brand: 8.9% $Na_2O$, 28.7% $SiO_2$), 19.6 grams of a seed solution (13.33 $Na_2O$: $Al_2O_3$:12.5 $SiO_2$:267 $H_2O$; see U.S. Pat. Nos. 3,574,538 and 4,340,573), the sodium-cesium gallate solution, and 6.37 grams conc. $H_2SO_4$ dissolved in 20 mls $H_2O$. The total weight of the mixture was adjusted to 300 grams by addition of $H_2O$. It was then thoroughly homogenized in a blender and allowed to cold age overnight in an ice bath. It was then reacted for 4.75 hours in an 100° C. oven. The white product was recovered by filtration, washed with distilled $H_2O$, and dried in an 115° C. oven. Phase analysis by powder x-ray diffraction showed the product to be ECR-10, with minor Ga—X(FAU) as impurity.

In summary, ECR-10 is a small pore zeolite having significant utility as an adsorbent in processes for separating small molecules in mixed gas streams.

What is claimed is:

1. A zeolite composition comprising in terms of mole ratio of oxides:

(Na,Cs)$_2$O:(Al,Ga)$_2O_3$:2 to 4 $SiO_2$:x$H_2O$ wherein x=0 to 6, the Ga/Al ratio is greater than four, and having the essential x-ray diffraction pattern lines given in Table 1 below:

TABLE 1

| D(A) | Peak Intensity | 2θ |
| --- | --- | --- |
| 10.5 | S | 8.41 |
| 3.50 | S | 25.45 |
| 3.32 | VS | 26.86 |
| 3.16 | S | 28.19 |
| 3.03 | S | 29.47 |
| 2.71 | M | 33.04 | where the peak intensity designations are VS=100-70; S=70-40; and M=40-20.

2. The zeolite of claim 1 having the composition, in terms of oxides:

$0.4$ to $0.7$ $Na_2O:0.3$ to $0.6$ $Cs_2O:0.8$ to $1.0$ $Ga_2O_3$: $0$ to $0.3$ $Al_2O_3$:$2$ to $4$ $SiO_2$:$xH_2O$

3. The zeolite of claim 1 having the composition, in terms of oxides of about:

$0.45$ to $0.55$ $Na_2O:0.45$ to $0.55$ $Cs_2O:(Al,Ga)_2O_3$: $2$ to $2.6$ $SiO_2$ and Ga/Al<4.

4. A process for preparing the zeolite composition of claim 1 which comprises:

(a) preparing a reaction mixture comprising an oxide of sodium, an oxide of cesium, water, a source of silica, a source of gallia, a source of alumina, and nucleating seeds, said reaction mixture having a composition, in terms of mole ratios of oxides, within the following ranges:

| | |
|---|---|
| $Na_2O:(Ga,Al)_2O_3$ | 1 to 3 |
| $Cs_2O:(Ga,Al)_2O_3$ | 0.1 to 2 |
| $Ga_2O_3:(Ga,Al)_2O_3$ | 0.7 to 1 |
| $SiO_2:(Ga,Al)_2O_3$ | 2 to 4 |
| $H_2O:(Ga,Al)_2O_3$ | 30 to 250 | and said seeds being present in an amount to yield 0.1 to 10 mole percent of the total final alumina plus gallia content in said zeolite composition;

(b) blending the reaction mixture sufficiently to form a substantially homogeneous mixture;

(c) maintaining the reaction mixture at between about 80° C. and 200° C. under autogenous pressure for a sufficient period of time to form product crystals; and (d) recovering said zeolite composition.

5. The process of claim 4 wherein the product has a composition, in terms of mole ratios of oxides, in the range:

$0.4$ to $0.7$ $Na_2O:0.3$ to $0.6$ $Cs_2O:(Ga,Al)_2O_3$: $2$ to $4$ $SiO_2$:$xH_2O$ wherein x is from 0 to 6, and Ga/Al<4

6. The process of claim 4 wherein the source of gallia is $Ga_2O_3$.

7. The process of claim 4 wherein the source of silica is sodium silicate and the sources of gallia are an alkali gallate and a gallium salt selected from the group consisting of the chloride, sulfate and nitrate salts.

8. The process of claim 4 where the source of alumina is the nucleating seeds.

9. The process of claim 4 wherein the reaction mixture is maintained between 80° C. and 200° C.

10. The process of claim 4 wherein the seeds are present in an amount to yield 0.1 to 10 mole percent of the total final alumina and gallia content.

11. A process of claim 4 wherein the addition of seeds is replaced by a cold age self-nucleation step lasting from 1 to 6 days.

12. Use of ion exchanged forms of the composition of claim 1 catalysts.

* * * * *